(12) United States Patent
Kato et al.

(10) Patent No.: US 12,065,013 B2
(45) Date of Patent: Aug. 20, 2024

(54) AIR CONDITIONER FOR VEHICLE

(71) Applicant: DENSO CORPORATION, Kariya (JP)

(72) Inventors: Shinya Kato, Kariya (JP); Fuminobu Watanabe, Kariya (JP); Yuki Tsumagari, Kariya (JP)

(73) Assignee: DENSO CORPORATION, Kariya (JP)

( * ) Notice: Subject to any disclaimer, the term of this patent is extended or adjusted under 35 U.S.C. 154(b) by 522 days.

(21) Appl. No.: 17/369,544

(22) Filed: Jul. 7, 2021

(65) Prior Publication Data

US 2021/0331551 A1  Oct. 28, 2021

Related U.S. Application Data

(63) Continuation of application No. PCT/JP2019/049880, filed on Dec. 19, 2019.

(30) Foreign Application Priority Data

Jan. 24, 2019 (JP) ................. 2019-010420

(51) Int. Cl.
*B60H 1/00* (2006.01)
(52) U.S. Cl.
CPC ............ *B60H 1/00064* (2013.01); *B60H 2001/00092* (2013.01)
(58) Field of Classification Search
CPC .... B60H 1/010064; B60H 2001/00092; F04D 29/4226
USPC ....................................................... 454/159
See application file for complete search history.

(56) References Cited

U.S. PATENT DOCUMENTS

| | | | | |
|---|---|---|---|---|
| 9,802,463 | B2* | 10/2017 | Maeda | B60H 1/00678 |
| 2016/0288609 | A1* | 10/2016 | Yamaoka | B60H 1/00678 |
| 2017/0106716 | A1* | 4/2017 | Hirai | B60H 1/00028 |
| 2018/0312029 | A1* | 11/2018 | Ito | B60H 1/00064 |
| 2019/0009647 | A1* | 1/2019 | Huenemoerder | B60H 1/22 |
| 2019/0255905 | A1 | 8/2019 | Tsumagari et al. | |
| 2019/0270359 | A1* | 9/2019 | Kato | B60H 1/00028 |

FOREIGN PATENT DOCUMENTS

| | | | | |
|---|---|---|---|---|
| DE | 0788905 | A2 * | 8/1997 | ............... B60H 1/00 |
| JP | 2016011101 | A | 1/2016 | |
| JP | 2018079918 | A | 5/2018 | |
| WO | WO-2015059884 | A1 * | 4/2015 | ......... B60H 1/00471 |
| WO | WO-2018096871 | A1 | 5/2018 | |

* cited by examiner

*Primary Examiner* — Edelmira Bosques
*Assistant Examiner* — Frances F. Hamilton
(74) *Attorney, Agent, or Firm* — Harness, Dickey & Pierce, P.L.C.

(57) ABSTRACT

An air conditioner for a vehicle includes a casing that forms an air passage through which air flows, a blower fan to blow out air, and a heating device to heat air. The casing includes a passage portion through which air flows, a warm air passage that allows air to flow to the heating device, and a bypass passage that allows air to bypass the heating device. A width dimension of the passage portion in a second direction is larger than that of the heating device in the second direction, and is smaller than a height dimension of the passage portion in a first direction.

5 Claims, 13 Drawing Sheets

AIR CONDITIONER FOR VEHICLE

CROSS REFERENCE TO RELATED APPLICATIONS

The present application is a continuation application of International Patent Application No. PCT/JP2019/049880 filed on Dec. 19, 2019, which designated the U.S. and claims the benefit of priority from Japanese Patent Application No. 2019-010420 filed on Jan. 24, 2019. The entire disclosures of all of the above applications are incorporated herein by reference.

TECHNICAL FIELD

The present disclosure relates to an air conditioner for a vehicle.

BACKGROUND

Conventionally, there is an air conditioner for a vehicle provided with a casing forming an air passage and a centrifugal blower inside the casing.

SUMMARY

According to an aspect of the present disclosure, an air conditioner that conditions air in a cabin for a vehicle, includes: a casing that forms an air passage through which air flows; a blower fan arranged inside the casing to rotate about a fan axis to suck in air from one side in an axial direction and to blow out air in a direction away from the fan axis; and a heating device arranged downstream of the blower fan in a flow of air inside the casing to heat air blown out from the blower fan. The casing includes a fan housing portion housing the blower fan and an equipment housing portion connected to the fan housing portion and housing the heating device. The fan housing portion has a passage portion at an outer side of the blower fan in a radial direction to form an outlet passage through which air blown from the blower fan flows. The equipment housing portion has a warm air passage that allows air blown from the blower fan to flow to the heating device, and a bypass passage that allows air blown from the blower fan to bypass the heating device. The warm air passage and the bypass passage are arranged in a first direction orthogonal to the axial direction, and a second direction is orthogonal to each of the axial direction and the first direction. A width dimension of the outlet passage in the second direction is larger than that of the heating device in the second direction, and the width dimension of the outlet passage in the second direction is smaller than a height dimension of the outlet passage in the first direction.

DESCRIPTION OF EMBODIMENT

Figure 1:
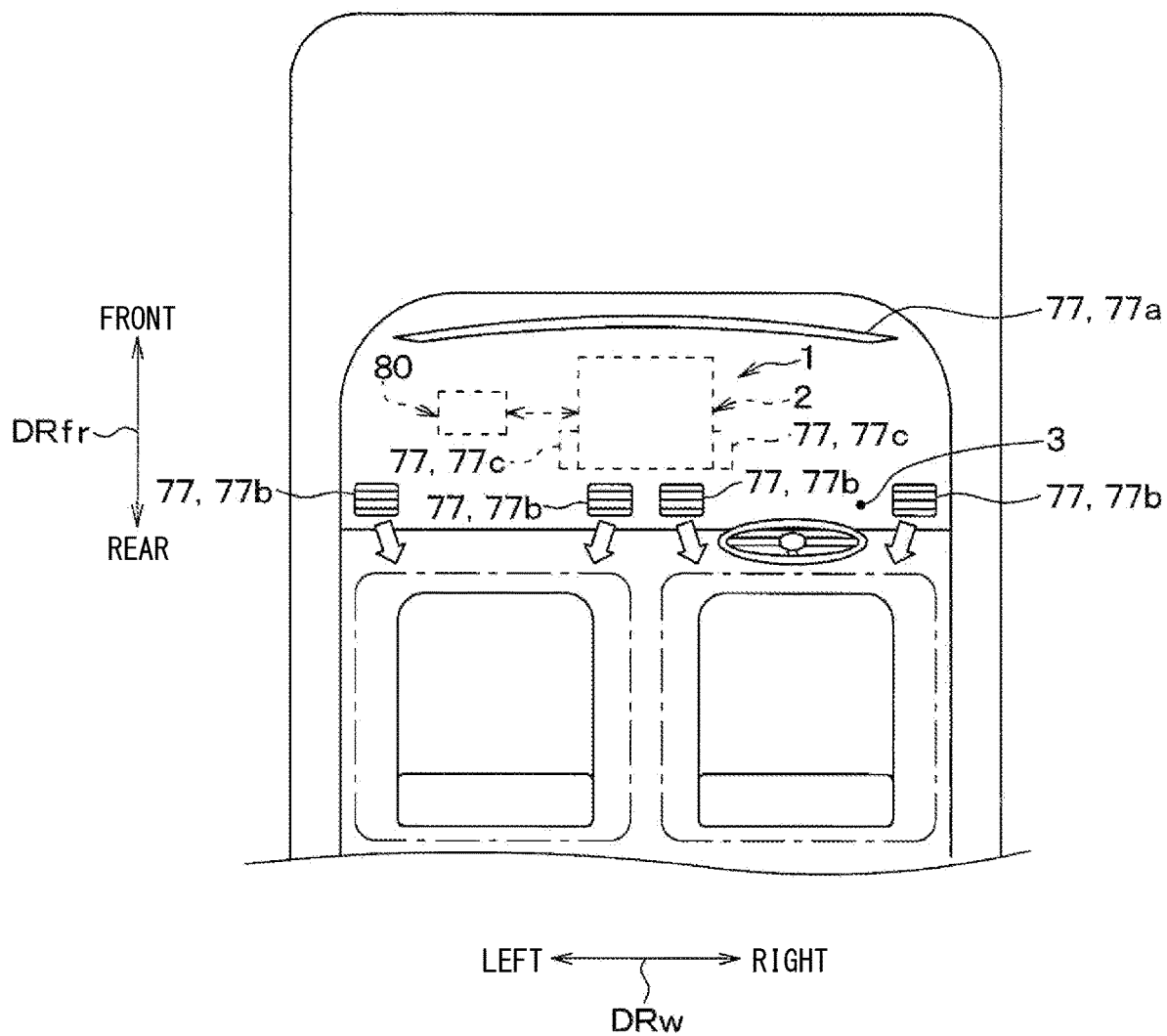
FIG. 1 is an explanatory diagram for explaining a position of an air conditioner in a vehicle.

To begin with, examples of relevant techniques will be described.

Conventionally, there is an air conditioner for a vehicle provided with a casing forming an air passage and a centrifugal blower inside the casing. The outer shape of the centrifugal blower is formed in a circular shape, and the centrifugal blower of the air conditioner is installed in the casing such that the axial direction of the centrifugal blower is substantially parallel to the air flow direction on the upstream side of the centrifugal blower.

The centrifugal blower has a structure in which the internal fan rotates to suck in air along the axis of the fan and blow out the air outward in the radial direction orthogonal to the axis of the fan. Therefore, the length in the radial direction tends to be larger than the length in the axial direction. Further, since an air passage through which the air blown from the centrifugal blower flows is required on the outer side of the centrifugal blower in the radial direction, the blower casing housing the centrifugal blower is further larger than the outer diameter of the centrifugal blower. Therefore, in an air conditioner for a vehicle in which a centrifugal blower and a heating device are installed, the outer diameter of the blower casing tends to be larger than the height dimension and the width dimension of the heating device.

When a heating device smaller than the outer diameter of the blower casing is arranged on the downstream side of the centrifugal blower, the air blown from the centrifugal blower spreads outward in the radial direction of the fan. Then, a contraction flow occurs, which contracts inward in the radial direction of the fan toward the heating device.

Generally, the opening shape of the blower casing is formed into a substantially perfect circular shape according to the outer diameter of the cylindrical centrifugal blower. However, for example, when the opening shape of the blower casing is elliptical, the air passage formed on the outer side of the centrifugal blower in the radial direction is not constant over the entire circumference, and there are an expanded portion and a contracted portion. Therefore, in the air passage formed on the outer side in the radial direction of the centrifugal blower, the air blown out from the centrifugal blower contracts when flowing from the expanded portion to the contracted portion in the air passage. When the air blown out from the centrifugal blower contracts, a pressure loss is generated, which is not preferable because the pressure loss causes noise and deterioration in the efficiency of the air conditioner.

The present disclosure provides an air conditioner for a vehicle, which is capable of suppressing a pressure loss caused by contraction in flow of air.

According to an aspect of the present disclosure, an air conditioner that conditions air in a cabin for a vehicle, includes:
  a casing that forms an air passage through which air flows;
  a blower fan arranged inside the casing to rotate about a fan axis to suck in air from one side in an axial direction and to blow out air in a direction away from the fan axis; and
  a heating device arranged downstream of the blower fan in a flow of air inside the casing to heat air blown out from the blower fan.

The casing includes a fan housing portion housing the blower fan and an equipment housing portion connected to the fan housing portion and housing the heating device,
  the fan housing portion has a passage portion at an outer side of the blower fan in a radial direction to form an outlet passage through which air blown from the blower fan flows,
  the equipment housing portion has a warm air passage that allows air blown from the blower fan to flow to the heating device, and a bypass passage that allows air blown from the blower fan to bypass the heating device,
  the warm air passage and the bypass passage are arranged in a first direction orthogonal to the axial direction,
  a second direction is orthogonal to each of the axial direction and the first direction,
  a width dimension of the outlet passage in the second direction is larger than that of the heating device in the second direction, and
  the width dimension of the outlet passage in the second direction is smaller than a height dimension of the outlet passage in the first direction.

Accordingly, the air conditioner is formed so that the blowout width dimension of the passage portion in the second direction is smaller than the blowout height dimension in the first direction. As a result, in the air conditioner, it is possible to suppress the spread of the air blown from the blower fan in the second direction, and to suppress the contraction of the air in the second direction, in the air passage from the blower fan to the heating device. Thus, the pressure loss caused by the contraction of air can be suppressed.

Further, since the blowout width dimension of the passage portion in the second direction is formed larger than the blowout height dimension of the passage portion in the first direction, the air blown out from the blower fan is likely to spread in the first direction. As a result, air can be appropriately distributed to each of the warm air passage and the bypass passage arranged side by side in the first direction.

From another point of view,
  an air conditioner that conditions air in a cabin for a vehicle, includes:
  a casing that forms an air passage through which air flows; and
  a blower fan arranged inside the casing to rotate about a fan axis to suck in air from one side in an axial direction and to blow out air in a direction away from the fan axis.

The casing includes a fan housing portion housing the blower fan,
  the fan housing portion has a passage portion at an outer side of the blower fan in a radial direction to form an outlet passage through which air blown from the blower fan flows,
  a first direction is orthogonal to the axial direction, and a second direction is orthogonal to each of the axial direction and the first direction,
  a blowout width dimension of the passage portion in the second direction is smaller than a blowout height dimension of the passage portion in the first direction, and
  the outlet passage includes a resistance portion in a region where a size of the passage portion is smaller than the blowout height dimension so as to suppress air from flowing in a circumferential direction of the blower fan.

Accordingly, the air conditioner is formed so that the blowout width dimension of the passage portion in the second direction is smaller than the blowout height dimension of the passage portion in the first direction. Further, the air conditioner is provided with the resistance portion in the region smaller than the blowout height dimension in the passage portion.

As a result, in the air passage formed on the outer side of the blower fan in the radial direction, the resistance portion suppresses air from flowing from the expanded portion of the air passage to the contracted portion of the air passage. Therefore, in the air conditioner, it is possible to suppress the contraction of air in the region smaller than the blowout height dimension in the passage portion, and it is possible to suppress the pressure loss caused by the contraction of air.

A reference numeral in parentheses attached to each component or the like indicates an example of correspondence between the component or the like and specific component or the like described in an embodiments below.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. In the following embodiments, the embodiments can be partially combined with each other as long as there is particularly no trouble in combination, even if the combinations are not specified in particular.

First Embodiment

The present embodiment will be described with reference to FIGS. 1 to 9. An air conditioner 1 for a vehicle of the present embodiment includes an indoor air-conditioning unit 2 and an air-conditioning controller 80. The indoor air-conditioning unit 2 adjusts the temperature of air in the cabin by blowing air adjusted to have a desired temperature into the cabin.

In the present embodiment, the arrow DRfr shown in FIG. 1 indicates the front-rear direction when the air conditioner 1 is installed in the vehicle. The arrow DRw shown in FIG. 1 indicates the left-right direction (that is, the width direction of the vehicle) when the air conditioner 1 is installed in the vehicle. Further, the arrow DRud shown in FIG. 2 indicates the vertical direction when the air conditioner 1 is installed in the vehicle.

As shown in FIG. 1, the indoor air-conditioning unit 2 is arranged inside the instrument panel 3 at the frontmost part of the cabin. The indoor air-conditioning unit 2 adjusts the air blown from the air blowing portion 77 arranged on the surface of the instrument panel 3 to have a desired temperature.

The air blowing portion 77 of the present embodiment includes a defroster outlet 77a, a face outlet 77b, and a foot outlet 77c.

The defroster outlet 77a is an outlet for blowing out air whose temperature has been adjusted by the indoor air-conditioning unit 2 toward the windshield (not shown) of the vehicle. The defroster outlet 77a opens on the surface of the instrument panel 3 near the windshield of the vehicle.

The face outlet 77b is an outlet for blowing out air whose temperature has been adjusted by the indoor air-conditioning unit 2 toward the upper body of an occupant seated in the front seat of the cabin. The face outlet 77b opens on the surface of the instrument panel 3 on the rear side of the defroster outlet 77a.

The foot outlet 77c is an outlet for blowing out air whose temperature has been adjusted by the indoor air-conditioning unit 2 toward the lower body of an occupant seated in the front seat of the cabin. The foot outlet 77c opens at the inner side of the instrument panel 3.

Figure 2:
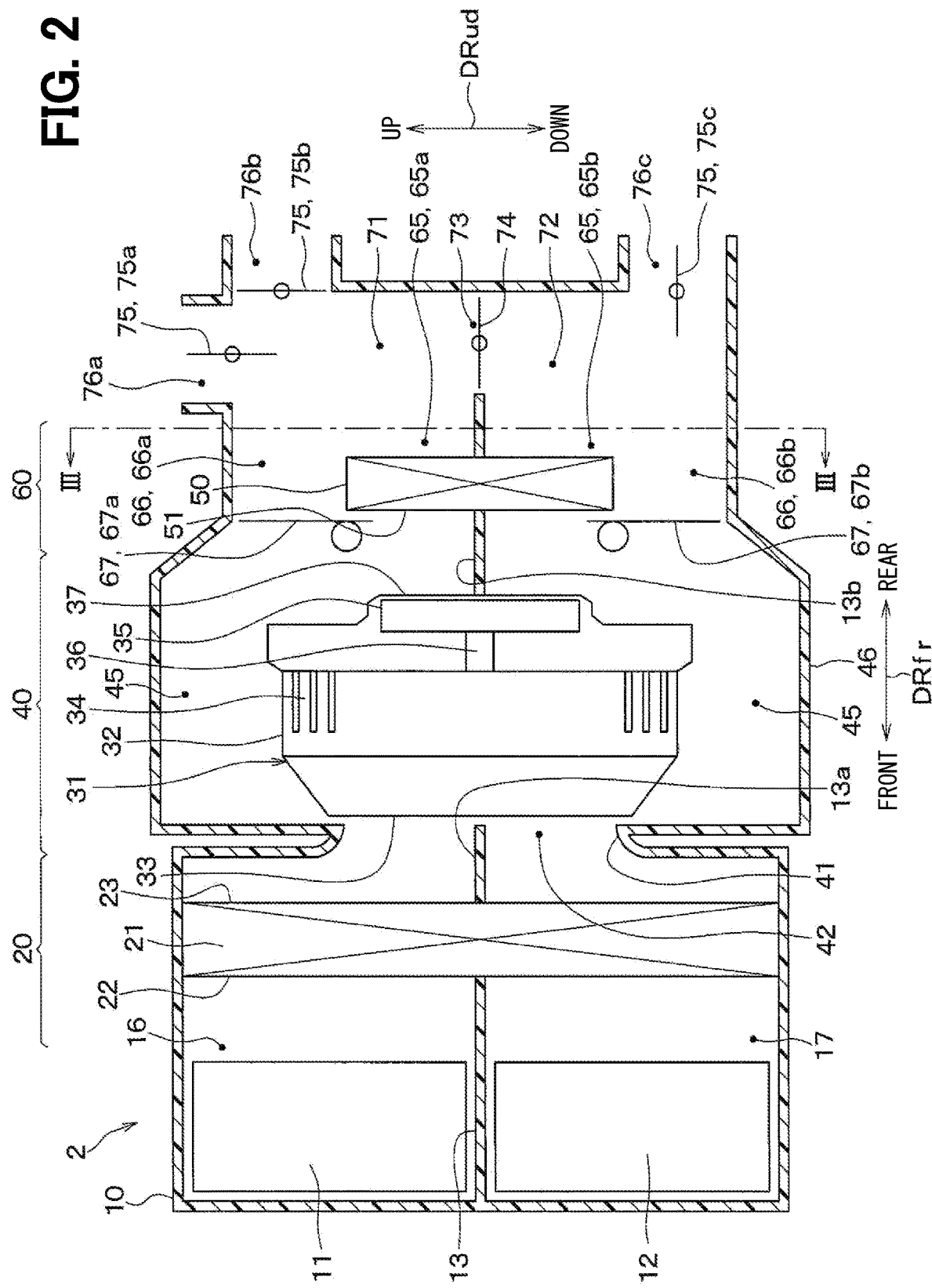
FIG. 2 is a schematic configuration diagram illustrating the air conditioner according to the first embodiment.

As shown in FIG. 2, the indoor air-conditioning unit 2 includes a casing 10, an evaporator 21, a blower fan 31, a heating device 50, and an air mix door 67.

The casing 10 forms an air passage through which air supplied to the cabin flows. The casing 10 is formed in a hollow shape, and is made of a material (for example, polypropylene) having excellent strength and a certain degree of elasticity.

Further, the casing 10 includes an evaporator housing portion 20 housing the evaporator 21, a fan housing portion 40 housing the blower fan 31, and an equipment housing portion 60 housing the heating device 50.

The casing 10 has an outside air introduction port 11 for introducing outside air from outside the cabin and an inside air introduction port 12 for introducing inside air from inside the cabin at the most upstream side in the air flow. The outside air introduction port 11 introduces outside air into the air passage inside the casing 10. The inside air introduction port 12 introduces inside air into the air passage inside the casing 10. The opening areas of the outside air introduction port 11 and the inside air introduction port 12 are continuously adjusted by an inside/outside air switching door (not shown). The inside/outside air switching door continuously changes the air volume ratio between the volume of the inside air and the volume of the outside air.

The air passage formed inside the casing 10 is partitioned by an inside/outside air partition wall 13 into an outside air passage 16 through which the outside air flows and an inside air passage 17 in which the inside air flows. The upstream side of the outside air passage 16 is connected to the outside air introduction port 11. The upstream side of the inside air passage 17 is connected to the inside air introduction port 12. The inside/outside air partition wall 13 is arranged inside the casing 10. The outside air passage 16 is an upper air passage in the vertical direction DRud. The lower air passage in the vertical direction DRud is the inside air passage 17.

The inside/outside air partition wall 13 extends in the horizontal direction and is formed in a flat plate that crosses the evaporator 21. As a result, the outside air introduced from the outside air introduction port 11 and the inside air introduced from the inside air introduction port 12 are sucked into the evaporator 21 in separated state. The evaporator housing portion 20 housing the evaporator 21 is formed downstream of the outside air introduction port 11 and the inside air introduction port 12 of the casing 10 in the air flow.

The evaporator housing portion 20 houses the evaporator 21 inside the casing 10. The evaporator housing portion 20 is formed in a hollow shape, and the cross-sectional shape is formed in a substantially rectangular shape. The evaporator housing portion 20 is provided with the inside/outside air partition walls 13 at the upstream side and the downstream side of the evaporator 21 in the air flow. The evaporator 21 is attached to the inner wall of the evaporator housing portion 20.

The evaporator 21 cools air passing through the evaporator 21 by evaporating the low-temperature low-pressure refrigerant flowing inside the evaporator 21. The evaporator 21 has an evaporator inflow surface 22 formed in a substantially rectangular shape. The evaporator inflow surface 22 spreads over the entire area of the outside air passage 16 and the inside air passage 17 inside the evaporator housing portion 20. Therefore, the outside air flowing at the upper side in the vertical direction DRud of the inside/outside air partition wall 13 passes through the upper portion of the evaporator 21. Further, the inside air flowing at the lower side in the vertical direction DRud of the inside/outside air partition wall 13 passes through the lower portion of the evaporator 21. The evaporator 21 forms a vapor compression refrigeration cycle together with a compressor, a radiator, an expansion valve, and the like (not shown). The fan housing portion 40 housing the blower fan 31 is formed downstream of the evaporator housing portion 20 in the air flow.

The blower fan 31 is a centrifugal blower that sucks in air along the axial direction of the fan axis CL of the blower fan 31 and blows the sucked air outward in the radial direction of the blower fan 31 orthogonal to the axial direction. The fan axis CL of the present embodiment is arranged along the front-rear direction DRfr of the vehicle. The blower fan 31 has an impeller 32 including blades (not shown), and the impeller 32 rotates about the fan axis CL to generate an air flow in the air passage in the casing 10.

The impeller 32 has an air suction port 33 for sucking air on one side in the axial direction. In the present embodiment, the impeller 32 has the air suction port 33 for sucking air on the front side of the vehicle in the front-rear direction DRfr. Further, the impeller 32 has an air outlet 34 that blows out the air sucked from the air suction port 33 outward in the radial direction away from the fan axis CL. The impeller 32 has a substantially columnar shape, and the air suction port 33 has in a substantially perfect circle shape.

The blower fan 31 is arranged so that the air suction port 33 faces the evaporator outflow surface 23 of the evaporator 21 at a predetermined distance. Further, the blower fan 31 includes an electric motor 35. The impeller 32 is rotatably connected to a motor shaft 36 connected to the electric motor 35. Further, the blower fan 31 is provided with a motor flange 37 for attaching the electric motor 35 to the fan housing portion 40.

The fan housing portion 40 is connected to the evaporator housing portion 20 and is formed in a hollow shape. The fan housing portion 40 has a suction passage portion 41 that forms a suction passage through which the outside air and the inside air that have passed through the evaporator 21 flow on the upstream side of the air suction port 33 in the air flow. Further, the fan housing portion 40 has a passage portion 46 at the outer side of the blower fan 31 in the radial direction to form an outlet passage 45 through which outside air and inside air blown from the blower fan 31 flow.

The suction passage portion 41 is an air passage for flowing the air that has passed through the evaporator 21 to the air suction port 33 of the blower fan 31. The suction passage portion 41 is formed by contracting so as to form a substantially perfect circle from the upstream side to the downstream side in the air flow. The suction passage portion 41 has a suction opening 42 at the most downstream side in the air flow and at the upstream side of the air suction port 33 in the air flow.

Further, in the suction passage portion 41, a suction side partition wall 13a is formed continuously with the inside/outside air partition wall 13 formed in the evaporator housing portion 20. The suction side partition wall 13a partitions the outside air passage 16 and the inside air passage 17 on the upstream side of the suction opening 42 in the air flow. The suction side partition wall 13a extends in the horizontal direction and is formed in a flat plate that crosses the suction opening 42. As a result, the outside air and the inside air that have passed through the evaporator 21 are sucked into the blower fan 31 in separated state.

The passage portion 46 is an air passage portion that forms an outlet passage 45 through which the air blown from the blower fan 31 flows at the outer side of the blower fan 31 in the radial direction. The air blown out from the blower fan 31 is introduced into the outlet passage 45 and flows toward the heating device 50 and the bypass passage 66 arranged on the downstream side in the air flow.

The outlet side partition wall 13b is formed in the passage portion 46 to partition the outside air passage 16 and the inside air passage 17. The outlet side partition wall 13b extends in the horizontal direction and is formed in a flat plate that crosses the passage portion 46. As a result, the blower fan 31 can blow out the outside air flowing through the outside air passage 16 and the inside air flowing through the inside air passage 17 in separated state. The outlet side partition wall 13b is fixed to the inner wall surface of the fan housing portion 40 and the equipment housing portion 60 at the downstream side of the impeller 32 of the blower fan 31 in the air flow. The details of the shape of the passage portion 46 will be described later.

The equipment housing portion 60 is formed in a hollow shape and connected to the fan housing portion 40. The equipment housing portion 60 forms an air passage for flowing the air blown from the blower fan 31 to the heating device 50 and the bypass passage 66. The equipment housing portion 60 is formed so as to contract in a rectangular shape from the upstream side to the downstream side in the air flow.

The equipment housing portion 60 is provided with the outlet side partition wall 13b on the upstream side and the downstream side of the heating device 50 in the air flow. The heating device 50 and the bypass passage 66 are configured in a state where the outside air and the inside air blown out from the blower fan 31 can pass through in the separated manner. The equipment housing portion 60 forms the outside air passage 16 on the upper side of the outlet side partition wall 13b in the vertical direction DRud and the inside air passage 17 on the lower side of the outlet side partition wall 13b in the vertical direction DRud. The outlet side partition wall 13b formed in the equipment housing portion 60 is located at the same position as the suction side partition wall 13a formed in the evaporator housing portion 20 in the vertical direction DRud.

Further, the equipment housing portion 60 includes a warm air passage 65 that allows the air blown from the blower fan 31 to flow to the heating device 50, and a bypass passage 66 that bypasses the heating device 50 for the air blown from the blower fan 31. The warm air passage 65 and the bypass passage 66 are arranged side by side in a direction orthogonal to the axial direction.

Specifically, as shown in FIG. 2, inside the equipment housing portion 60 of the present embodiment, a first warm air passage 65a is formed on the upper side of the outlet side partition wall 13b in the vertical direction DRud, and a second warm air passage 65b is formed on the lower side of the outlet side partition wall 13b in the vertical direction DRud. The outside air blown out from the blower fan 31 flows to the upper portion of the heating device 50 through the first warm air passage 65a. The inside air blown from the blower fan 31 flows to the lower portion of the heating device 50 through the second warm air passage 65b.

Further, a first bypass passage 66a is formed at the upper side of the first warm air passage 65a in the vertical direction DRud, and a second bypass passage 66b is arranged at the lower side of the second warm air passage 65b in the vertical direction DRud, inside the equipment housing portion 60. The outside air blown out from the blower fan 31 bypasses the heating device 50 through the first bypass passage 66a. The inside air blown out from the blower fan 31 bypasses the heating device 50 through the second bypass passage 66b. That is, inside the equipment housing portion 60, the first bypass passage 66a is formed alongside the first warm air passage 65a, on the upper side of the heating device 50 in the vertical direction DRud, and the second bypass passage 66b is formed alongside the warm air passage 65b, on the lower side of the heating device 50 in the vertical direction DRud.

Inside the equipment housing portion 60, the first warm air passage 65a and the first bypass passage 66a, and the second warm air passage 65b and the second bypass passage 66b are arranged side by side in the vertical direction DRud orthogonal to the axial direction.

Further, the equipment housing portion 60 is provided with a first air mix door 67a for adjusting the amount of air flowing through the first warm air passage 65a and the first bypass passage 66a on the upstream side of the heating device 50 in the air flow. Further, the equipment housing portion 60 is provided with a second air mix door 67b for adjusting the amount of air flowing through the second warm air passage 65b and the second bypass passage 66b on the upstream side of the heating device 50 in the air flow. The heating device 50 is arranged at substantially the center of the equipment housing portion 60 in the vertical direction DRud. The details of the shape of the equipment housing portion 60 will be described later.

The first air mix door 67a is a temperature control unit configured to adjust the temperature of air blown into the cabin by adjusting the volume ratio of the air flowing into the heating device 50 and the air flowing through the first bypass passage 66a bypassing the heating device 50. The second air mix door 67b is a temperature control unit configured to adjust the temperature of air blown into the cabin by adjusting the volume ratio of the air flowing into the heating device 50 and the air flowing through the second bypass passage 66b bypassing the heating device 50.

The first air mix door 67a and the second air mix door 67b of the present embodiment are composed of sliding doors that slide in a direction intersecting the horizontal direction.

The first air mix door 67a and the second air mix door 67b are able to be driven independently of each other by an output from an actuator (not shown). The first air mix door 67a and the second air mix door 67b may be composed of a revolving door that rotates about a rotation axis.

The heating device 50 is a heating heat exchanger arranged on the downstream side of the blower fan 31 in the air flow to heat the air flowing through the outside air passage 16 and the inside air passage 17. The heating device 50 heats the outside air and the inside air passing through the heating device 50 by exchanging heat between the cooling water for cooling the engine (not shown) and the air blown from the blower fan 31. The heating device 50 of the present embodiment is arranged inside the equipment housing portion 60 over a part of the outside air passage 16 and the inside air passage 17. The heating device 50 is attached to the inner wall of the equipment housing portion 60 in the left-right direction DRw. The details of the shape of the heating device 50 will be described later.

The outside air mixing unit 71 and the inside air mixing unit 72 are arranged downstream of the heating device 50 in the air flow. The outside air passing through the first bypass passage 66a and the outside air passing through the heating device 50 are mixed in the outside air mixing unit 71. The inside air passing through the second bypass passage 66b and the inside air passing through the heating device 50 are mixed in the inside air mixing unit 72.

The outside air mixing unit 71 and the inside air mixing unit 72 are communicated with each other by a vertical communication passage 73 installed between the outside air mixing unit 71 and the inside air mixing unit 72. Further, a vertical communication door 74 for opening and closing the vertical communication passage 73 is arranged in the vertical communication passage 73. The vertical communication door 74 is driven by an output from an actuator (not shown).

The outside air introduced from the outside air introduction port 11 is introduced into the inside air mixing unit 72 by opening the vertical communication door 74. Further, the inside air introduced from the inside air introduction port 12 is introduced into the outside air mixing unit 71 by opening the vertical communication door 74. Openings for blowing out temperature-controlled air from the casing 10 into the cabin are formed downstream of the outside air mixing unit 71 and the inside air mixing unit 72 in the air flow.

Specifically, as shown in FIG. 1, a defroster opening 76a and a face opening 76b are formed downstream of the outside air mixing unit 71. A foot opening 76c is formed downstream of the inside air mixing unit 72. That is, the defroster opening 76a and the face opening 76b are formed on the upper side of the foot opening 76c in the vertical direction DRud.

Further, a mode switching door 75 is arranged upstream of each of the openings 76a, 76b, and 76c in the air flow to open and close each opening to change the air blowing mode. Specifically, the mode switching door 75 includes a defroster switching door 75a, a face switching door 75b, and a foot switching door 75c respectively arranged upstream of the defroster opening 76a, the face opening 76b, and the foot opening 76c in the air flow.

The defroster opening 76a communicates with the defroster outlet 77a via a duct (not shown). The face opening 76b communicates with the face outlet 77b via a duct (not shown). The foot opening 76c communicates with the foot outlet 77c.

The defroster opening 76a and the face opening 76b are able to communicate with the outside air passage 16 by the vertical communication door 74 at the most downstream side of the casing 10. At the most downstream side of the casing 10, the foot opening 76c is able to communicate with the inside air passage 17 by the vertical communication door 74.

Therefore, when the vertical communication door 74 fully closes the vertical communication passage 73, the outside air flowing through the outside air passage 16 is introduced into the cabin through the defroster opening 76a and the face opening 76b. When the vertical communication door 74 completely closes the vertical communication passage 73, the inside air flowing through the inside air passage 17 is introduced into the cabin through the foot opening 76c. When the vertical communication door 74 fully opens the vertical communication passage 73, the outside air and the inside air mixed by the outside air mixing unit 71 and the inside air mixing unit 72 are introduced into the cabin through the defroster opening 76a, the face opening 76b, and the foot opening 76c.

Next, the air-conditioning controller 80 will be described. The air-conditioning controller 80 has a well-known microcomputer including a processor, a memory, and the like, and peripheral circuits thereof. The air-conditioning controller 80 performs various calculations and processes based on control programs stored in the memory and controls the operation of various devices connected to the air-conditioning controller 80. The memory is a non-transitional tangible storage medium.

Various sensors (not shown) for controlling the air-conditioning, such as an inside air sensor, an outside air sensor, a solar radiation sensor, an evaporator temperature sensor that detects the temperature of air blown from the evaporator 21, and a cabin temperature sensor that detects the temperature inside the cabin, are connected to the input side of the air-conditioning controller 80.

Further, an air-conditioning operation panel (not shown) is connected to the input side of the air-conditioning controller 80. Operation signals from various operation switches of the air-conditioning operation panel are input to the air-conditioning controller 80. The air-conditioning operation panel is arranged near the instrument panel 3. The various operation switches may include an operation switch of the air conditioner 1, an air suction mode changeover switch, and a temperature setting switch for setting a target temperature in the cabin.

The air-conditioning controller 80 integrally includes software and hardware, as air-conditioning control means, that is connected to its output side for controlling various control devices. A part of the control devices connected to the output side of the air-conditioning controller 80 may be configured as a separate control means.

Next, details of each shape of the passage portion 46, the equipment housing portion 60, and the heating device 50 of the present embodiment will be described with reference to FIGS. 3 and 4. In the present embodiment, the warm air passage 65 and the bypass passage 66 are arranged side by side in the vertical direction DRud of the vehicle. Hereinafter, the arrangement direction of the warm air passage 65 and the bypass passage 66 is referred to as a first direction. Further, the left-right direction DRw of the vehicle orthogonal to each of the first direction and the axial direction is referred to as a second direction.

Figure 3:
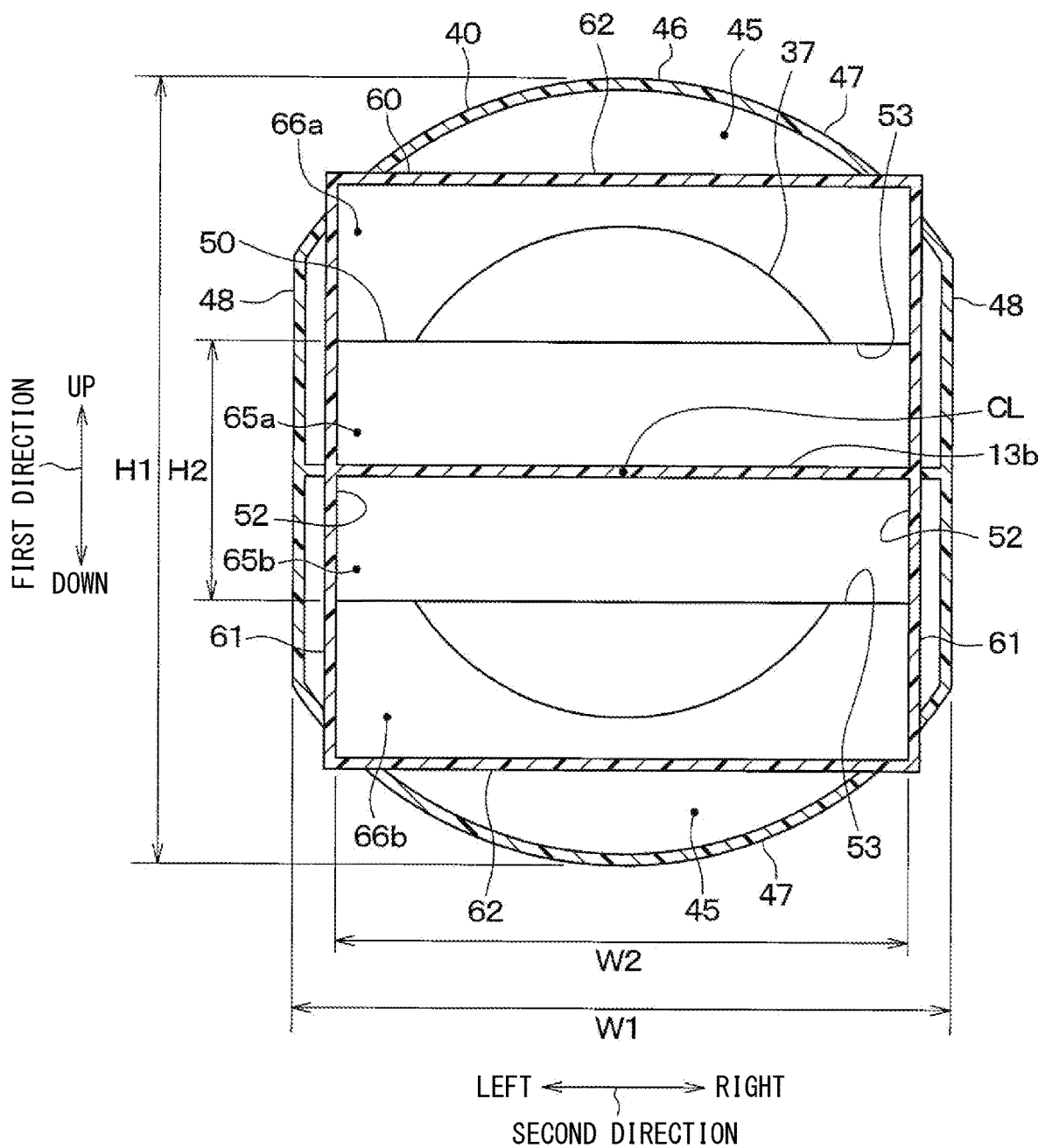
FIG. 3 is a cross-sectional view taken along a line III-III in FIG. 2.

As shown in FIG. 3, the passage portion 46 of the present embodiment has an outer shape configured by a connection of a pair of blowout short side portions 47 facing each other in the first direction and a pair of blowout long side portions 48 facing each other in the second direction. Specifically, in the passage portion 46, the pair of blowout short side portions 47 facing in the first direction are formed in an arc shape, and the pair of blowout long side portions 48 facing in the second direction are formed in a straight line. The passage portion 46 has a blowout width dimension W1 which is the size of the passage portion 46 in the second direction. The blowout width dimension W1 is smaller than a blowout height dimension H1 which is the size of the passage portion 46 in the first direction.

In the passage portion 46, the blowout short side portion 47 may be formed in a straight line, and the blowout long side portion 48 may be formed in an arc shape. Alternatively, in the passage portion 46, both the blowout short side portion 47 and the blowout long side portion 48 may be formed in a straight line. Further, in the passage portion 46, both the blowout short side portion 47 and the blowout long side portion 48 may be formed in an arc shape.

Figure 4:
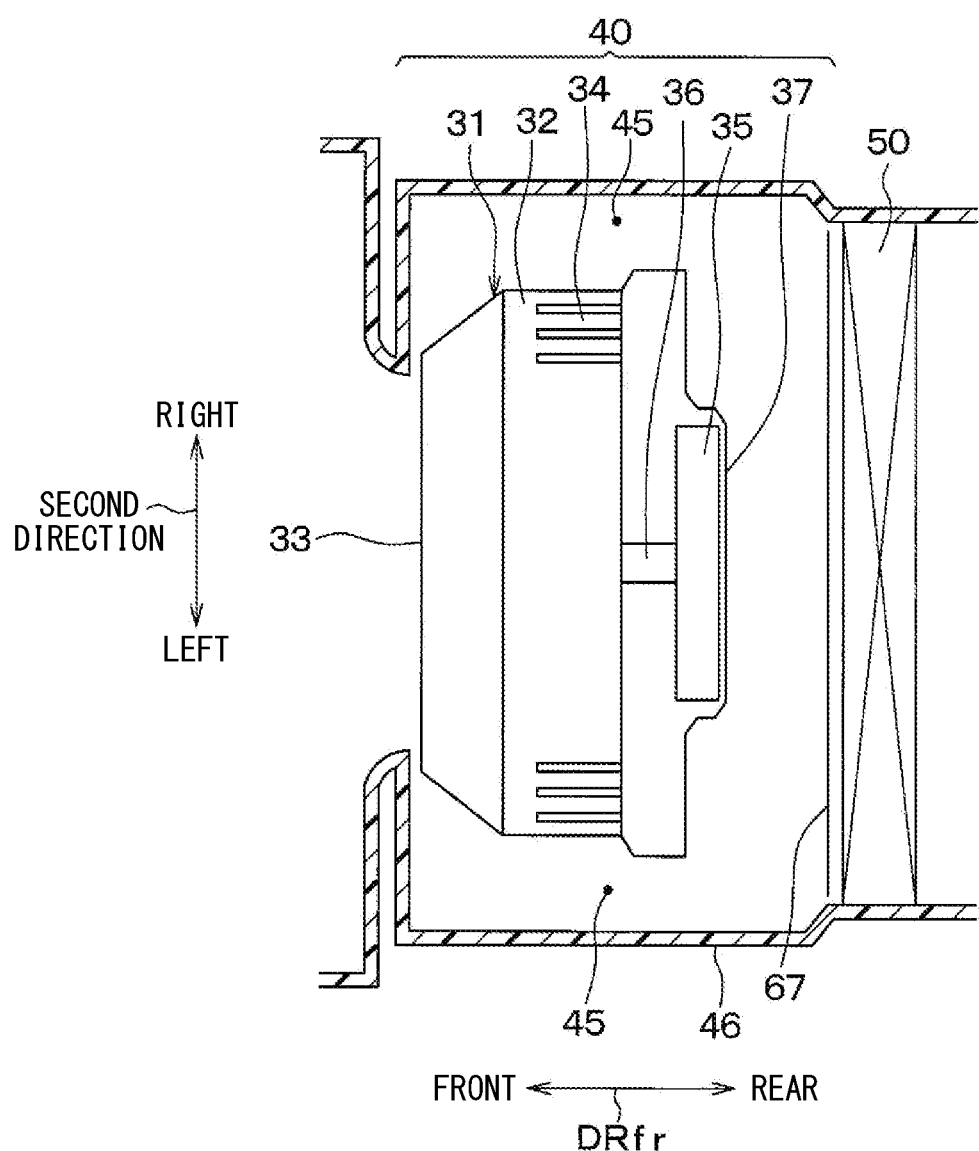
FIG. 4 is an explanatory diagram for explaining sizes of a fan housing portion and an equipment housing portion according to the first embodiment.

As shown in FIGS. 3 and 4, the equipment housing portion 60 has an opening shape, downstream from the heating device 50 in the air flow, configured by a connection of a pair of first device side portions 61 facing in the second direction and a pair of second device side portions 62 facing in the first direction. Further, in the equipment housing portion 60, the first device side portion 61 and the second device side portion 62 are formed to have substantially the same size.

As shown in FIGS. 3 and 4, the heating device 50 has a heater inflow surface 51 to which air inflows, and the heater inflow surface 51 has a substantially rectangular shape. The heater inflow surface 51 is shaped by a connection of a pair of heater long side portions 53 facing each other in the first direction and a pair of heater short side portions 52 facing each other in the second direction. The heating device 50 has a heater width dimension W2, which is the size of the heating device 50 in the second direction. The heater width dimension W2 is larger than a heater height dimension H2, which is the size of the heating device 50 in the first direction. Specifically, the heating device 50 is formed such that the heater short side portion 52 is smaller than the heater long side portion 53.

In the present embodiment, the passage portion 46 is formed so that the blowout width dimension W1 is larger than the heater width dimension W2 and the blowout height dimension H1 is larger than the heater height dimension H2.

Figure 5:
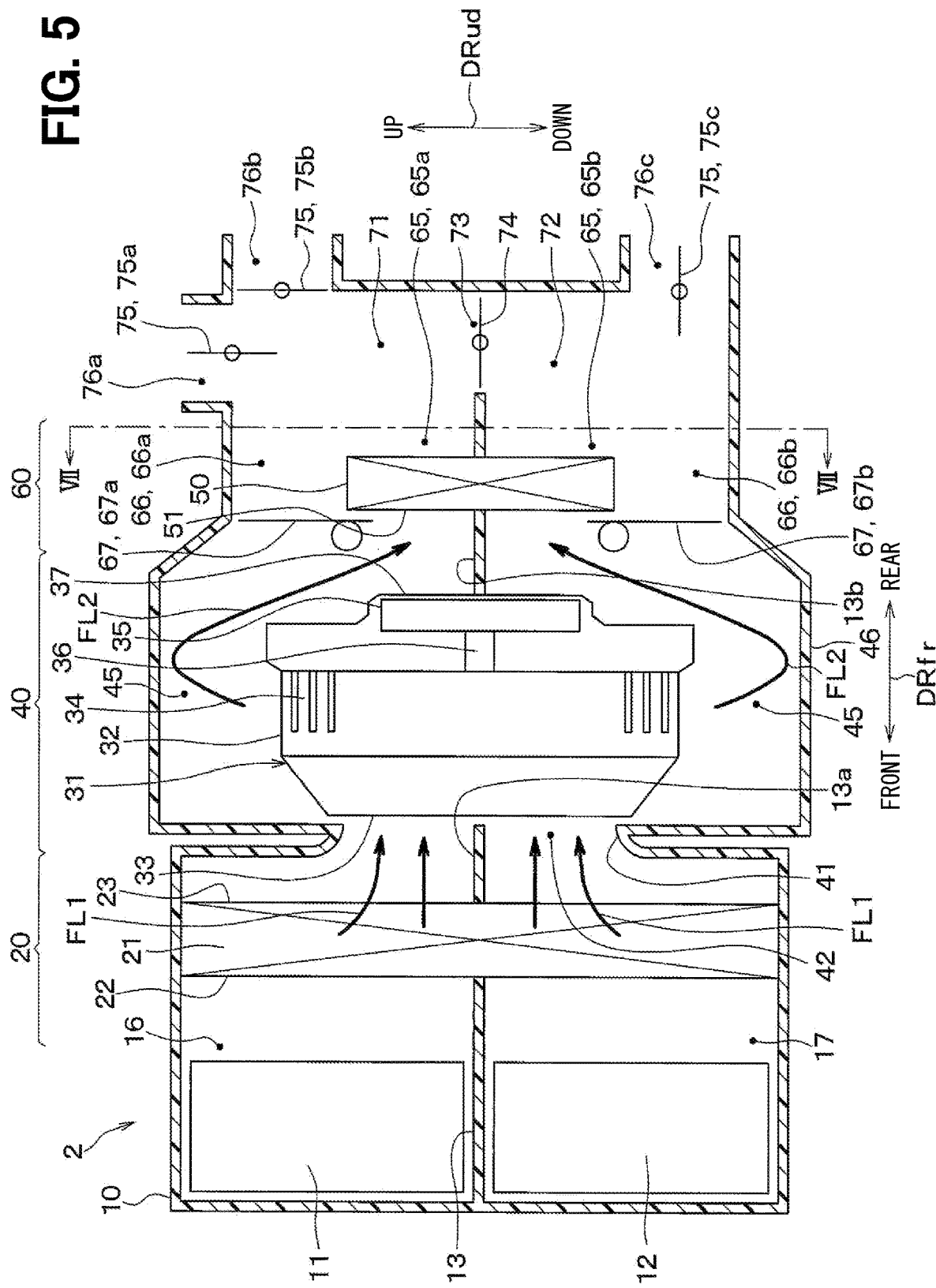
FIG. 5 is an explanatory diagram illustrating a flow of air in a first direction in an air conditioner for a vehicle as a comparative example.
Figure 6:
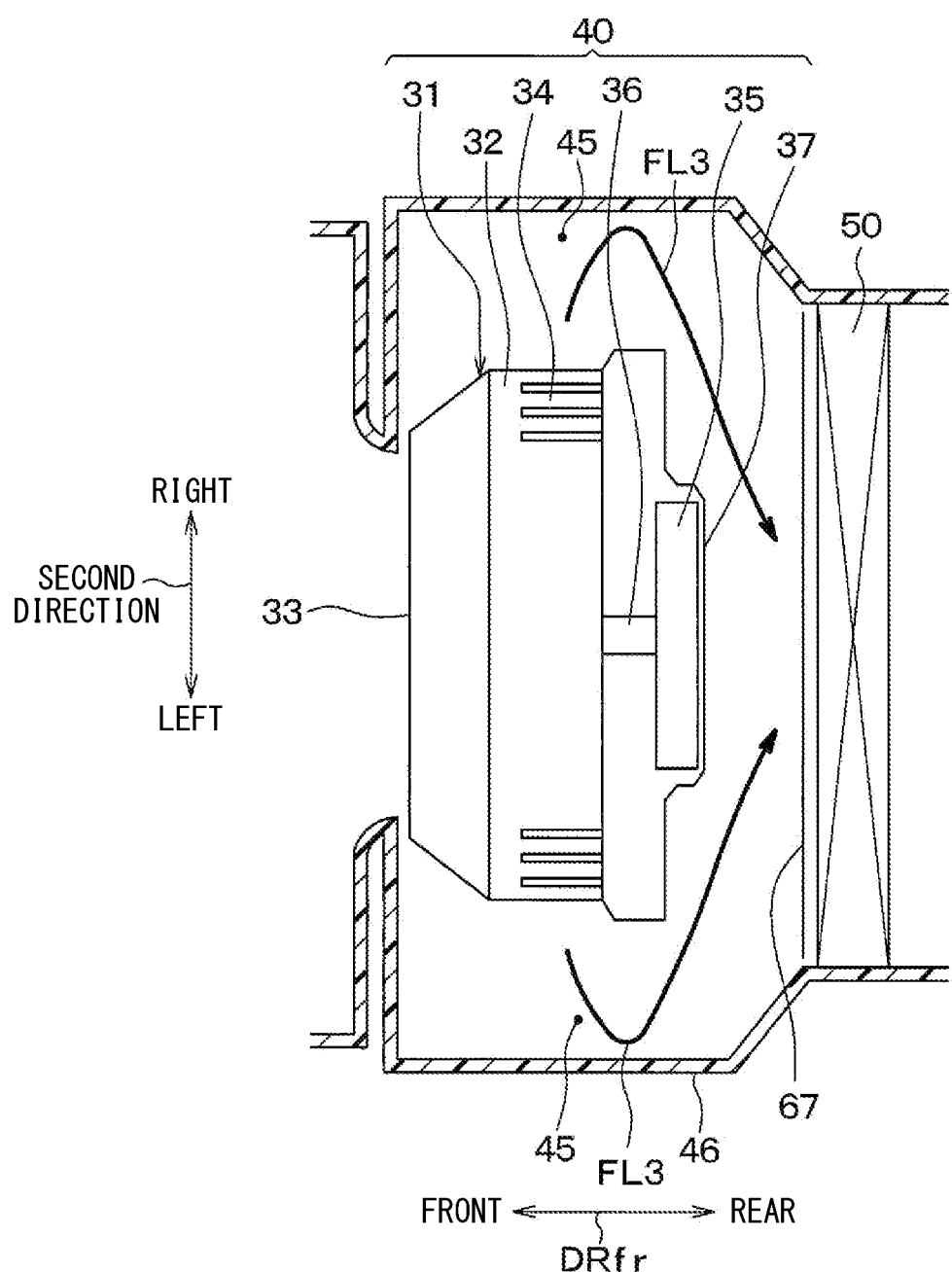
FIG. 6 is an explanatory diagram illustrating a flow of air in a second direction in an air conditioner for a vehicle as a comparative example.

Next, the operation of the air conditioner 1 will be described with reference to FIGS. 5 to 9. First, in order to explain the operation of the air conditioner 1, operations of a vehicle air conditioner which is a comparative example of the air conditioner 1 of the present embodiment will be described with reference to FIGS. 5 to 7. FIGS. 5 and 6 are explanatory views for explaining how the air flows in the first direction and the second direction of the vehicle in the comparative example.

Figure 7:
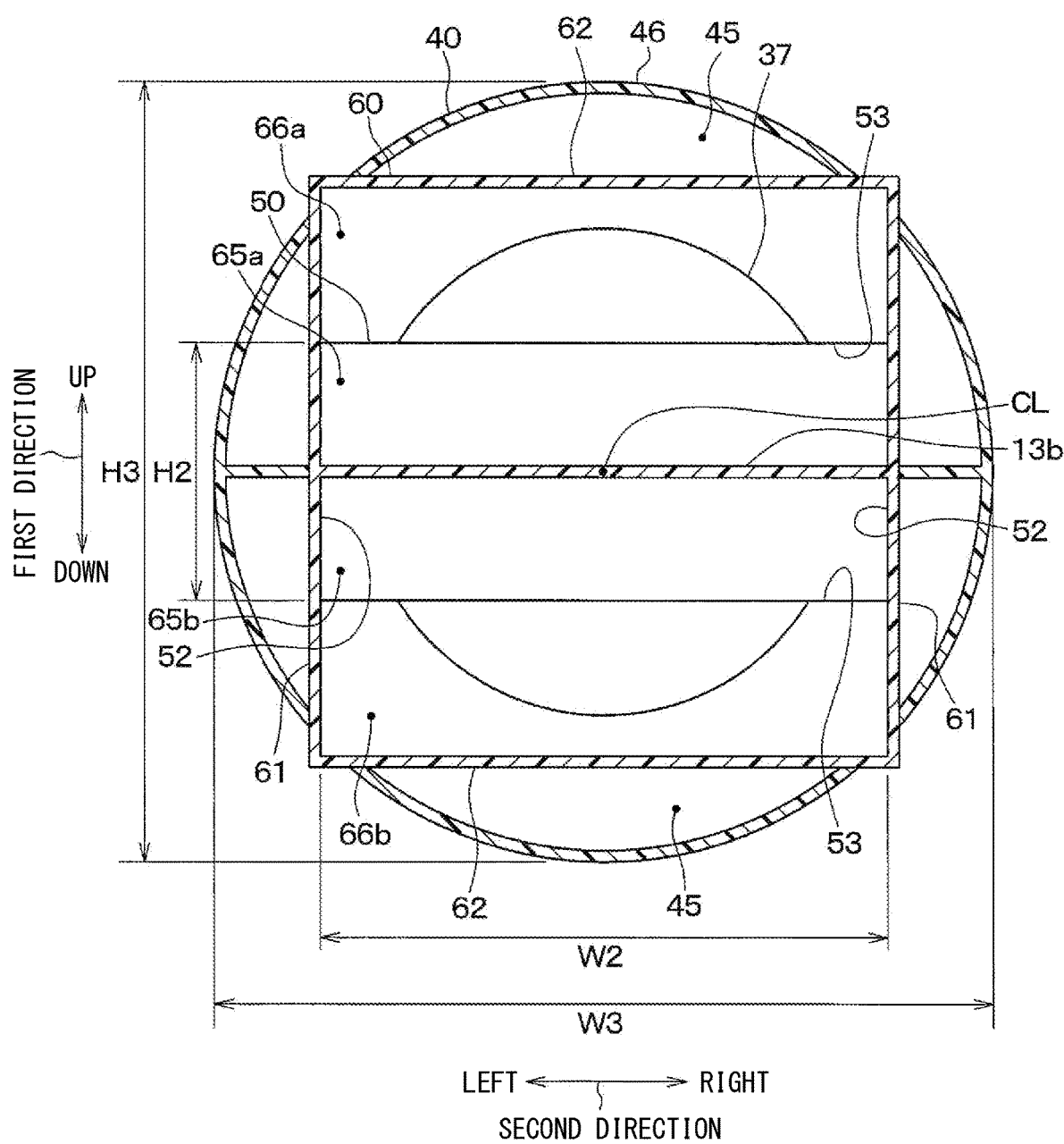
FIG. 7 is a cross-sectional view taken along a line VII-VII in FIG. 5.

In the comparative example, a blowout width dimension W3 which corresponds to the passage portion 46 of the present embodiment is larger than the blowout width dimension W1 of the passage portion 46. Further, as shown in FIG. 7, in the comparative example, the blowout width dimension W3 and the blowout height dimension H3 are formed to have the same size in the passage portion 46 which corresponds to the passage portion 46 of the present embodiment. The air conditioner 1 of the comparative example has the same other configurations as the air conditioner 1 of the present embodiment.

The air conditioner 1 of the present embodiment and the air conditioner 1 of the comparative example control the inside/outside air switching door and the vertical communication door 74 to change the air introduction mode in the indoor air-conditioning unit 2 to the outside air mode, the inside air mode, or the inside/outside air two-layer mode.

The outside air mode is an air suction mode in which the outside air introduced from the outside air introduction port 11 is blown out into the cabin. In the outside air mode, the air-conditioning controller 80 controls the inside/outside air switching door so that the inside air introduction port 12 is fully closed, and the vertical communication door 74 is set to a position where the vertical communication passage 73 allows the communication.

The inside air mode is an air suction mode in which the inside air introduced from the inside air introduction port 12 is blown out into the cabin. In the inside air mode, the air-conditioning controller 80 controls the inside/outside air switching door so that the outside air introduction port 11 is fully closed, and the vertical communication door 74 is set to a position where the vertical communication passage 73 allows the communication.

In the inside/outside air two-layer mode, the outside air, which has a lower relative humidity than the inside air, is blown out toward the windshield inside the vehicle to prevent the fogging, and the inside air, which has a higher relative humidity than the outside air, is circulated inside the vehicle for heating. The inside/outside air two-layer mode is an air suction mode that can improve the heating efficiency. In the inside/outside air two-layer mode, the air-conditioning controller 80 controls the inside/outside air switching door so that the outside air introduction port 11 and the inside air introduction port 12 are opened, and controls the vertical communication door 74 such that the vertical communication passage 73 is fully closed.

In the inside/outside air two-layer mode, when the blower fan 31 is rotationally driven, the indoor air-conditioning unit 2 introduces outside air from the outside air introduction port 11 into the outside air passage 16 and introduces inside air from the inside air introduction port 12 into the inside air passage 17.

The outside air flowing through the outside air passage 16 is cooled and dehumidified as passing through the upper portion of the evaporator 21. Then, the outside air that has passed through the upper portion of the evaporator 21 is heated by the upper portion of the heating device 50, and is blown out toward the windshield on the front surface of the cabin through the defroster opening 76a arranged on the upper side of the casing 10.

The inside air flowing through the inside air passage 17 is cooled and dehumidified when passing through the lower portion of the evaporator 21. Then, the inside air that has passed through the lower portion of the evaporator 21 is heated by the lower portion of the heating device 50, and is blown toward the lower body of the occupant through the foot opening 76c arranged on the lower side of the casing 10. This makes it possible to heat the cabin while preventing the windows from fogging.

FIG. 5 shows the flow of air in the casing 10 when the air conditioner 1 of the comparative example operates in the inside/outside air two-layer mode. In the inside/outside air two-layer mode, for example, the air-conditioning controller 80 controls the first air mix door 67a so that the first bypass passage 66a is fully closed, and controls the second air mix door 67b so that the second bypass passage 66b is fully closed. Further, the air-conditioning controller 80 controls the defroster switching door 75a so that the defroster opening 76a opens, and controls the foot switching door 75c so that the foot opening 76c opens.

As shown in FIG. 5, the outside air and the inside air introduced into the casing 10 by the rotational drive of the blower fan 31 flow into the evaporator 21 through the outside air passage 16 and the inside air passage 17 and are cooled. Then, the outside air and the inside air that have passed through the evaporator 21 are sucked into the air suction port 33 of the blower fan 31 through the suction passage portion 41 as shown by the arrow FL1 in FIG. 5. The outside air and the inside air sucked from the air suction port 33 are blown out from the air outlet 34 toward the outlet passage 45 on the outer side in the radial direction.

The air blown into the outlet passage 45 is blown out so as to spread outward in the radial direction as shown by the arrow FL2 in FIG. 5 and FL3 in FIG. 6. At that time, the air collides with the inner wall of the fan housing portion 40 to flow toward the rear side of the vehicle in the front-rear direction DRfr. When the first air mix door 67a is arranged at a position where the first bypass passage 66a is fully closed and the second air mix door 67b completely closes the second bypass passage 66b, all the air colliding with the inner wall of the fan housing portion 40 flows toward the heating device 50.

Here, in the passage portion 46 of the comparative example, the blowout width dimension W3 in the second direction is larger than the heater width dimension W2 in the second direction of the heating device 50. Therefore, as shown in FIG. 6, the air flowing in the second direction of the passage portion 46 contracts inward in the radial direction and flows toward the heating device 50. The air blown out from the blower fan 31 contracts to generate a pressure loss, which causes noise and deterioration of the efficiency of the air conditioner.

Then, the outside air introduced into the heating device 50 is heated by the heating device 50 and blown out from the defroster opening 76a via the outside air mixing unit 71 on the downstream side. Further, the inside air introduced into the heating device 50 is heated by the heating device 50 and blown out from the foot opening 76c via the inside air mixing unit 72 on the downstream side.

When the air conditioner 1 is used at the maximum capacity of the cooling operation, the air-conditioning controller 80 controls the first air mix door 67a so that the first bypass passage 66a is fully opened. Further, the air-conditioning controller 80 controls the second air mix door 67b so that the second bypass passage 66b is fully opened.

Figure 8:
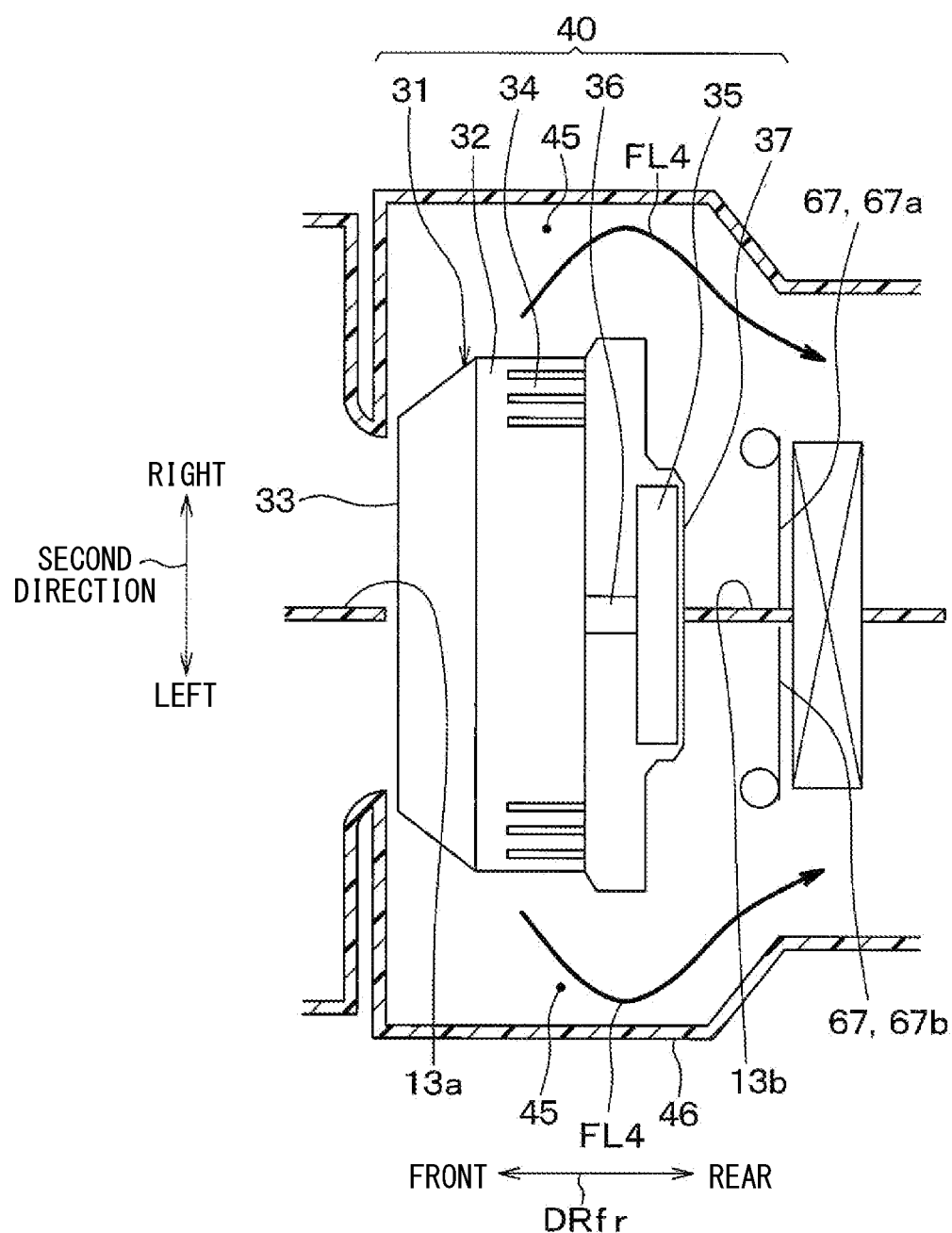
FIG. 8 is an explanatory diagram illustrating a flow of air during cooling operation in the air conditioner according to the first embodiment.

In this case, the air blown out to the passage portion 46 is blown out so as to spread outward in the radial direction as shown by the arrow FL4 in FIG. 8, and all the air is directed toward the bypass passage 66. Since the bypass passage 66 is arranged outside relative to the arrangement position of the heating device 50 in the radial direction, the air flowing from the blower fan 31 toward the bypass passage 66 is unlikely to be contracted. Therefore, the pressure loss caused by the contraction is small in the air blown out in the first direction of the passage portion 46, compared with a case where the first bypass passage 66a and the second bypass passage 66b are fully closed while operating at the maximum capacity of the heating operation.

Next, the difference in the air flow between the air conditioner 1 of the present embodiment and the comparative example will be described with reference to FIGS. 6 and 9.

Figure 9:
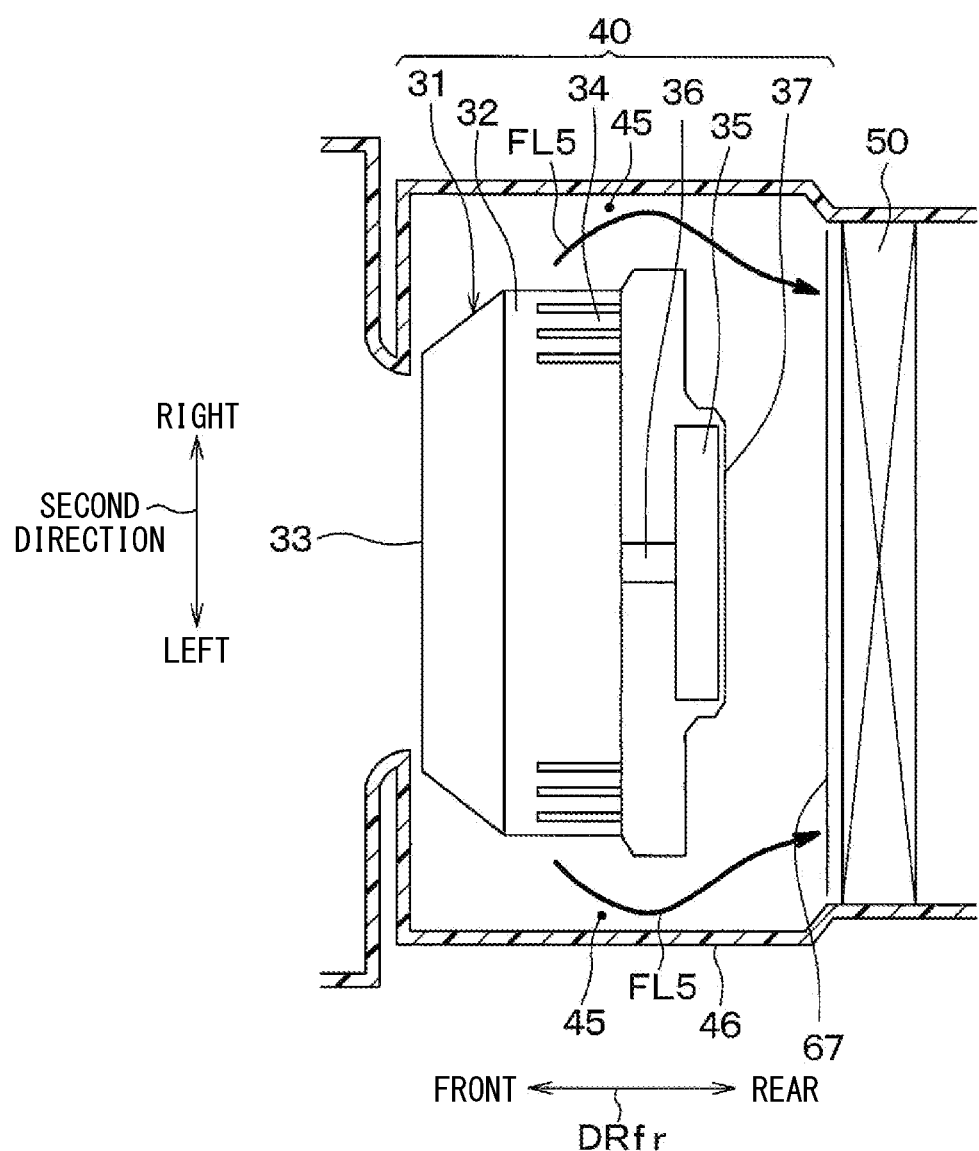
FIG. 9 is an explanatory diagram illustrating a flow of air in a second direction in the air conditioner according to the first embodiment.

In the air conditioner 1 of the present embodiment, the air blown from the air outlet 34 to the passage portion 46 is blown out so as to spread outward in the radial direction as shown in FL5 in FIG. 9. After that, the air collides with the inner wall of the fan housing portion 40 and flows toward the heating device 50.

Similar to the comparative example, the passage portion 46 of the present embodiment is formed so that the blowout width dimension W1 in the second direction is larger than the heater width dimension W2 in the second direction of the heating device 50. Therefore, as shown in FIG. 9, the air flowing in the second direction of the passage portion 46 contracts inward in the radial direction and flows toward the heating device 50.

Here, the passage portion 46 of the present embodiment is formed so that the blowout width dimension W1 is smaller than the blowout width dimension W3 of the comparative example. Therefore, the air flowing from the second direction of the passage portion 46 toward the heating device 50 is suppressed from spreading outward in the radial direction as compared with the comparative example.

As a result, according to the air conditioner 1 of the present embodiment, it is possible to suppress the contraction in the air passage from the blower fan 31 to the heating device 50 in the second direction, compared with the case where the blowout width dimension and the blowout height dimension of the passage portion 46 are the same size. That is, the air conditioner 1 can suppress the pressure loss due to the contraction as compared with the case where the blowout width dimension and the blowout height dimension of the passage portion 46 are the same size.

Further, in the passage portion 46 of the present embodiment, the blowout height dimension H1 is formed to be larger than the blowout width dimension W1. Therefore, the air blown out from the blower fan 31 tends to spread in the first direction. As a result, air can be appropriately distributed to each of the warm air passage 65, the first bypass passage 66a, and the second bypass passage 66b. This is suitable for the air conditioner 1 that requires an appropriate temperature control function for air.

Further, the passage portion 46 has the blowout height dimension H1 larger than the blowout width dimension W1 so that the first bypass passage 66a and the second bypass passage 66b are secured sufficiently large for passing cooled air. Therefore, the air conditioner 1 is provided without increasing the pressure loss in the air passage from the blower fan 31 to the heating device 50 in the first direction while suppressing the pressure loss in the air passage from the blower fan 31 to the heating device 50 in the second direction.

Further, the passage portion 46 of the present embodiment has an outer shape configured by a connection of the pair of arcuate blowout short side portions 47 facing in the first direction and the pair of linear blowout long side portions 48 facing in the second direction. As a result, the air flowing from the second direction of the passage portion 46 toward the heating device 50 is suppressed from expanding outward in the radial direction, compared with the case where the pair of blowout long side portions 48 facing in the second direction are formed in an arc shape. That is, the passage portion 46 can suppress the contraction and the pressure loss due to the contraction in the air passage from the blower fan 31 to the heating device 50 in the second direction as compared with the case where the pair of blowout long side portions 48 facing in the second direction are formed in an arc shape.

Modification of First Embodiment

In the first embodiment, the outer shape of the passage portion 46 is configured by the connection of the pair of blowout short side portions 47 facing in the first direction and the pair of blowout long side portions 48 facing in the second direction. However, the present disclosure is not limited to this.

The outer shape of the passage portion 46 may be formed of, for example, a polygonal shape, an elliptical shape, or various other shapes.

Second Embodiment

Figure 10:
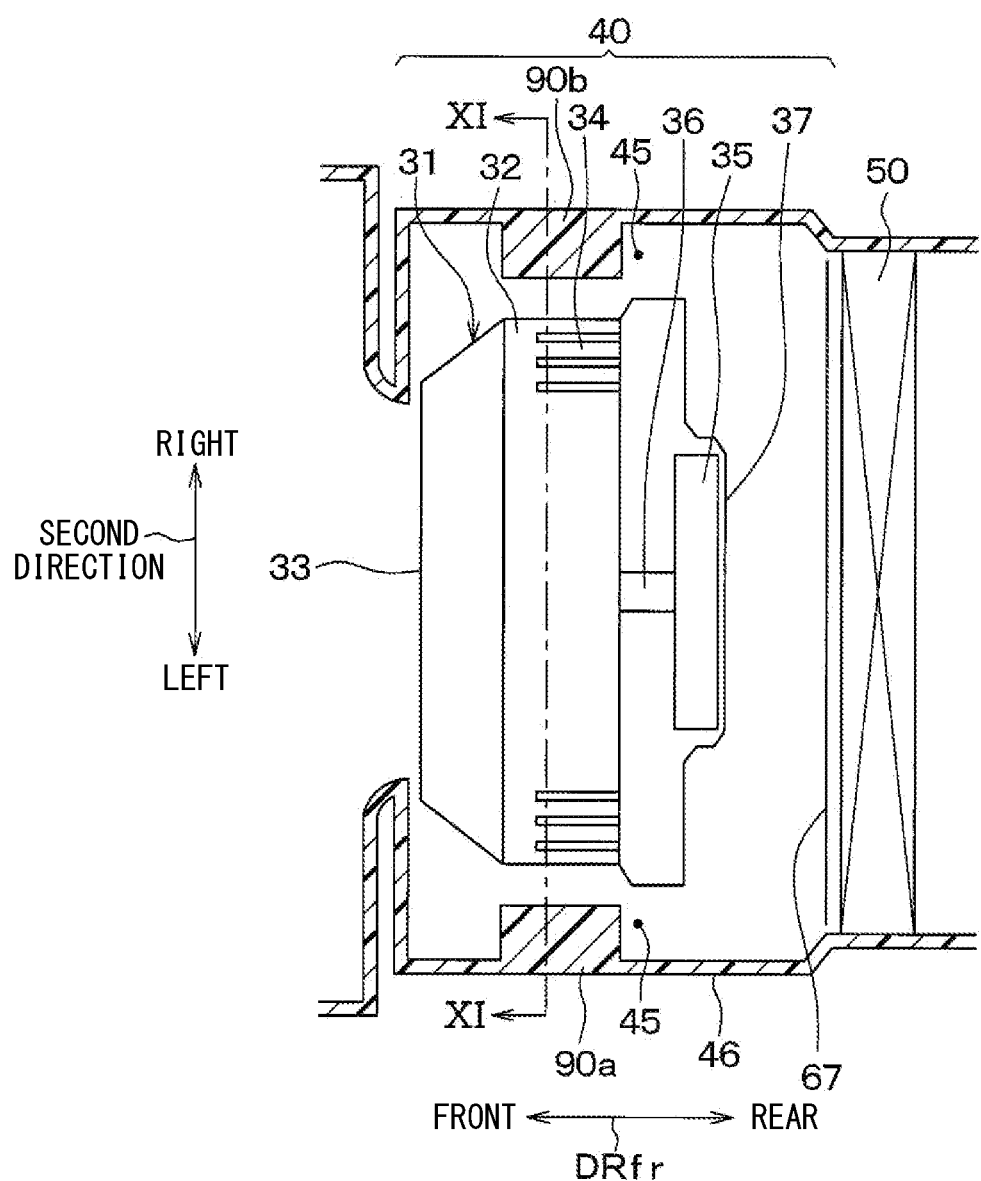
FIG. 10 is a schematic configuration diagram illustrating an air conditioner for a vehicle according to a second embodiment.
Figure 11:
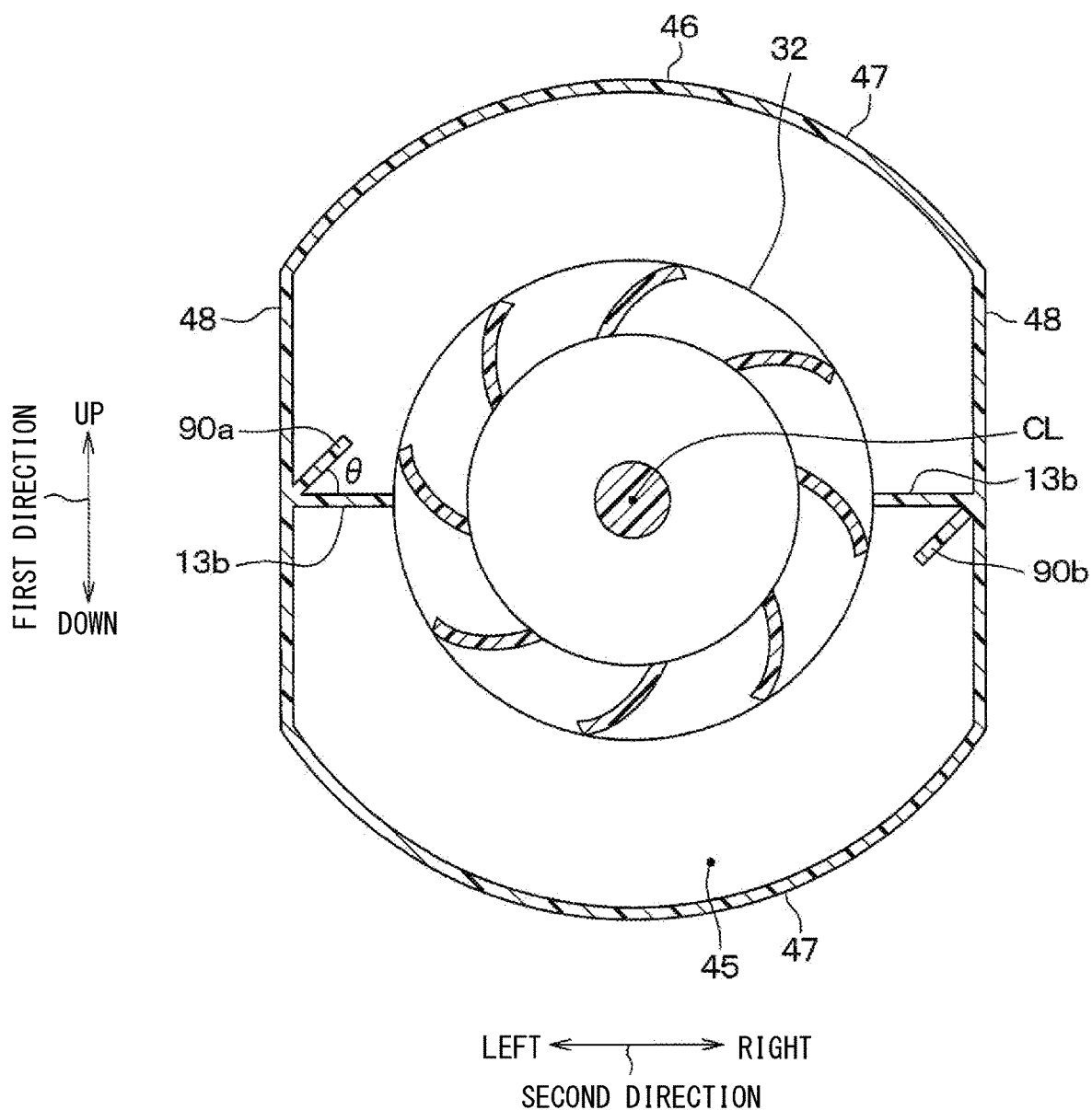
FIG. 11 is a cross-sectional view taken along a line XI-XI in FIG. 10.
Figure 12:
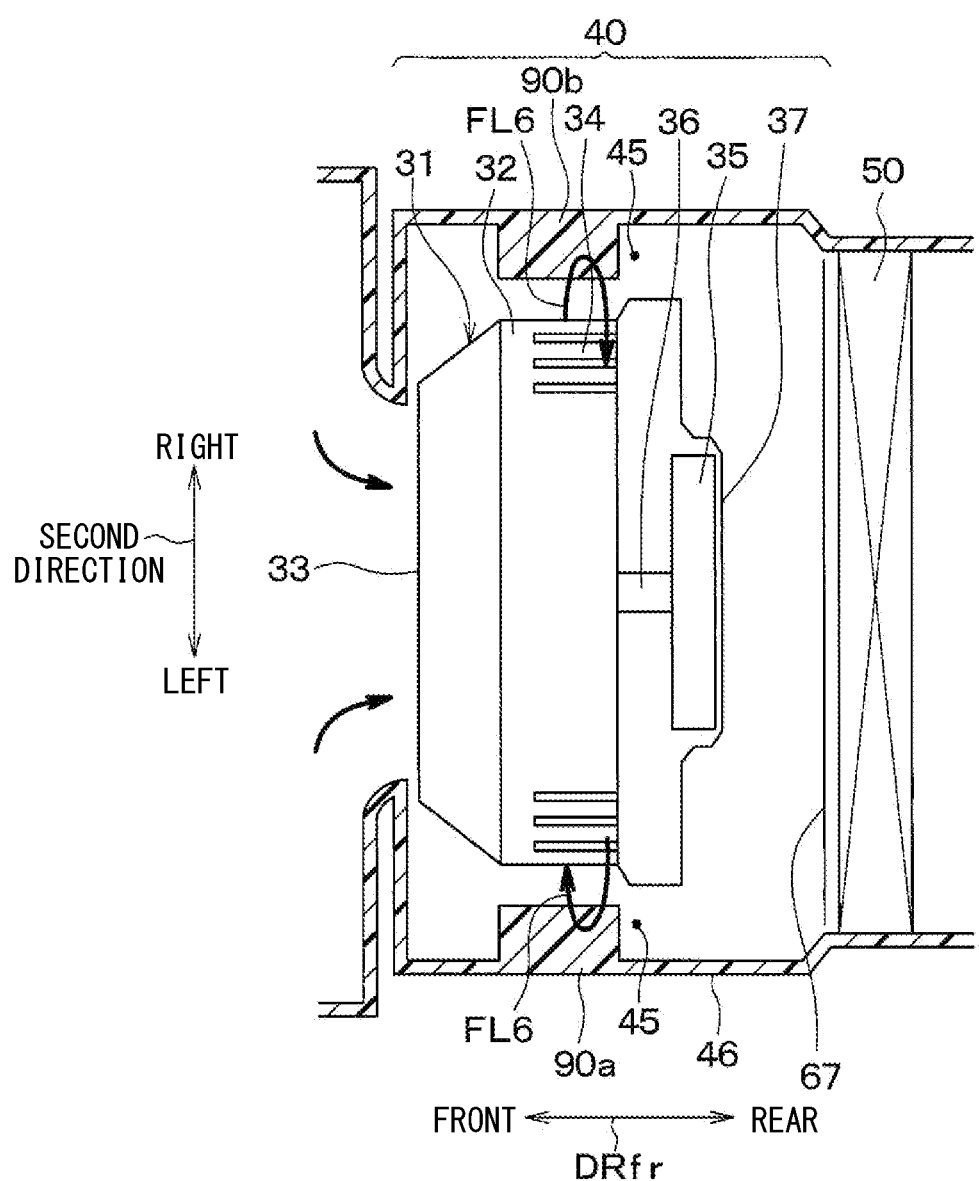
FIG. 12 is an explanatory diagram illustrating a flow of air in a circumferential direction of a blower fan in the air conditioner according to the second embodiment.

Next, a second embodiment will be described with reference to FIGS. 10 to 13. In the present embodiment, as shown in FIGS. 10 and 11, differently from the first embodiment, a resistance portion 90 is provided in the outlet passage 45, for suppressing the air from flowing in the circumferential direction of the blower fan 31, in a region where the size of the passage portion 46 is smaller than the blowout height dimension. In the present embodiment, a difference part different from the first embodiment will be mainly described, and description for a part similar to the first embodiment will be omitted.

In the air conditioner 1 of the present embodiment, the blower fan 31 is composed of, for example, a turbofan which is a kind of centrifugal blower. The blower fan 31 includes, for example, the impeller 32 that rotates clockwise with respect to the axial direction so that the air blown out from the air outlet 34 can rotate in the same direction as the impeller 32 rotates. Therefore, the air blown out from the blower fan 31 includes not only the velocity component in the radial direction but also the velocity component in the rotation direction. Therefore, the air blown out to the passage portion 46 flows along the rotation direction of the fan as shown in FL6 in FIG. 12 and FL7 in FIG. 13.

The passage portion 46 of the present embodiment formed on the outer side of the blower fan 31 in the radial direction continuously has the pair of arcuate blowout short side portions 47 facing in the first direction and the pair of linear blowout long side portions 48 facing in the second direction. Further, the passage portion 46 is formed so that the blowout width dimension W1 is smaller than the blowout height dimension H1. Therefore, the cross section of the outlet passage 45 is the largest when passing through the area having the maximum blowout height dimension. The cross section of the outlet passage 45 is the smallest when passing through the area having the minimum blowout width dimension and the area where the distance between the blowout long side portion 48 and the fan axis CL is the smallest.

Figure 13:
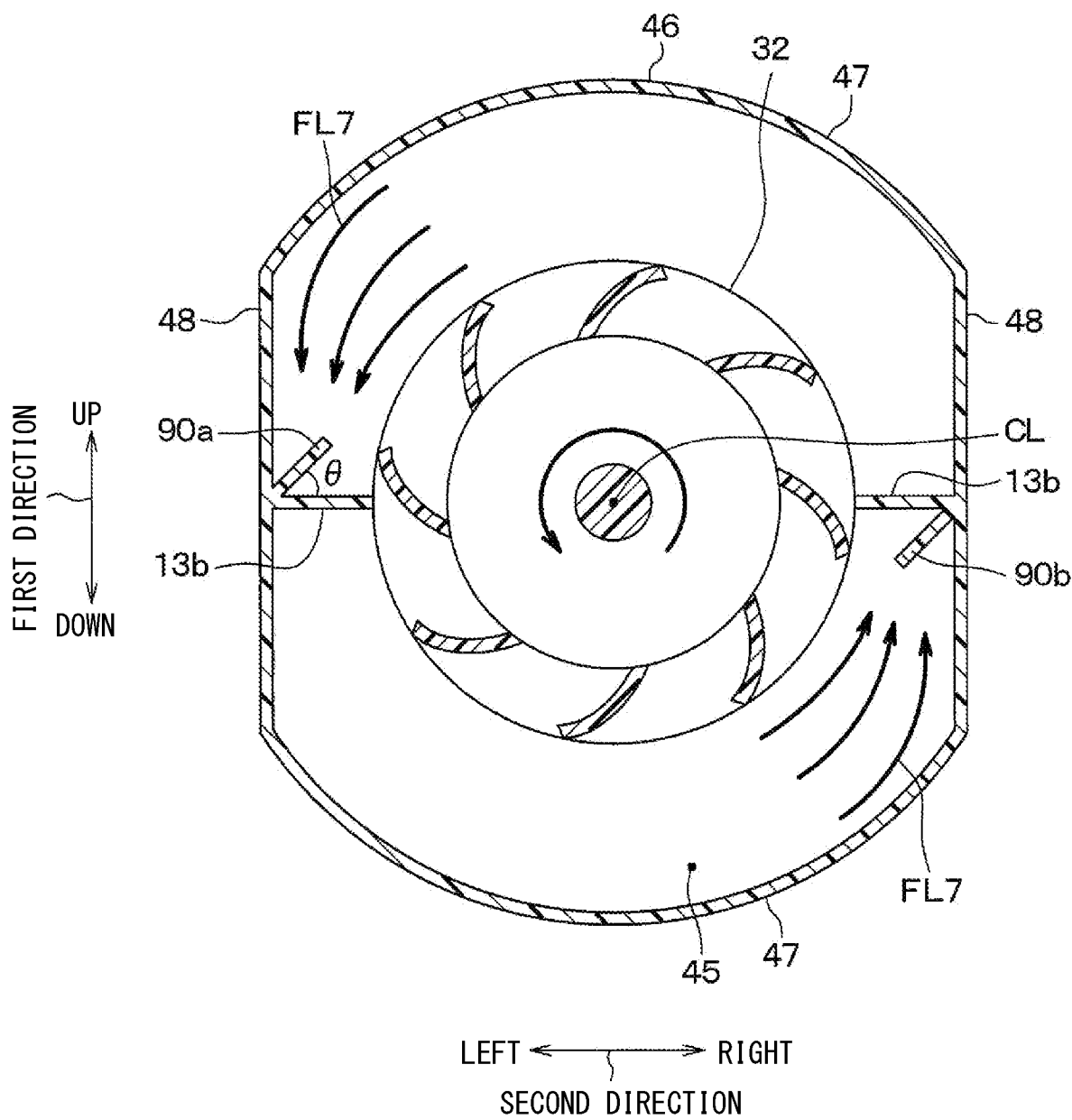
FIG. 13 is an explanatory diagram illustrating a flow of air in the circumferential direction of the blower fan in the air conditioner according to the second embodiment.

Therefore, as shown in FIG. 13, the air blown out from the blower fan 31 contracts when the cross section of the outlet passage 45 becomes smaller. As shown in the first embodiment described above, the contraction is not preferable because the contraction causes a pressure loss.

Therefore, in the air conditioner 1 of the present embodiment, as shown in FIGS. 10 and 11, the resistance portion 90 that suppresses the flow of air in the rotation direction of the blower fan 31 is added in the outlet passage 45. The resistance portion 90 is an air resistance member that facilitates the air blown out from the air outlet 34 to flow in the axial direction by suppressing the air from flowing in the rotation direction of the blower fan 31.

The resistance portion 90 is, for example, made of the same material as the outlet side partition wall 13b, and is integrally molded with the outlet side partition wall 13b. The resistance portion 90 is arranged in a region where the size of the passage portion 46 is smaller than the blowout height dimension. Specifically, in the present embodiment, the resistance portion 90 is formed on the outlet side partition wall 13b to have a flat plate shape extended inward of the passage portion 46 from the portion where the distance between the passage portion 46 and the fan axis CL is minimized. Further, the resistance portion 90 has a first resistance portion 90a installed on one side in the second direction and a second resistance portion 90b installed on the other side in the second direction.

As shown in FIG. 11, the first resistance portion 90a and the second resistance portion 90b are arranged at a predetermined angle θ with respect to the horizontal direction in order to suppress the flow of air in the rotation direction. The resistance portion 90 may be formed separately from the casing 10, and can be attached to the casing 10.

The predetermined angle θ is set, for example, at 45°. The predetermined angle θ is set within a range larger than 0° and smaller than 90° not overlapping with the inside/outside air partition wall 13 and the blowout long side portion 48.

In the air flowing through the outlet passage 45 in the circumferential direction of the blower fan 31, when flowing through the area where the distance between the passage portion 46 and the fan axis CL is the maximum, the air flows toward a position where the distance between the passage portion 46 and the fan axis CL is the minimum. In the present embodiment, the first resistance portion 90a and the second resistance portion 90b are arranged at the position where the distance between the passage portion 46 and the fan axis CL is minimized. Therefore, the air flowing toward the position where the distance between the passage portion 46 and the fan axis CL is minimized is suppressed from flowing to the contracted portion of the outlet passage 45. Further, the air blown out from the blower fan 31 includes not only the velocity component in the rotation direction but also the velocity component in the radial direction. Therefore, the air blown out from the blower fan 31 is suppressed from flowing in the rotation direction, and facilitated to flow in the radial direction.

That is, according to the air conditioner 1, it is possible to suppress the contraction and suppress the pressure loss caused by the contraction, in a region smaller than the blowout height dimension by suppressing the air from flowing from the expanded portion to the contracted portion of the outlet passage 45 by the resistance portion 90.

Modification of Second Embodiment

In the second embodiment, the resistance portion 90 is arranged on the outlet side partition wall 13b, but not limited to this. For example, the resistance portion 90 may be arranged on the inner wall of the passage portion 46 while the size of the passage portion 46 is smaller than the blowout height dimension in the outlet passage 45.

Further, in the second embodiment, the blowout width dimension W1 of the passage portion 46 is larger than the heater width dimension W2, but is not limited to this. For example, the blowout width dimension W1 of the passage portion 46 may be smaller than the heater width dimension W2.

Further, in the second embodiment, the resistance portion 90 is arranged each of the one side and the other side of the outlet side partition wall 13b, but is not limited to this. For example, the resistance portion 90 may be arranged on either one side or the other side of the outlet side partition wall 13b. Further, two or more resistance portions 90 may be arranged on the outlet side partition wall 13b and the passage portion 46.

Other Embodiments

The representative embodiments of the present disclosure have been described above. However, the present disclosure is not limited to the above-described embodiments, and may be variously modified as follows.

In the embodiment, the air conditioner 1 controls the inside/outside air switching door and the vertical communication door 74, so that the air suction mode can be set to any one of the outside air mode, the inside air mode, and the inside/outside air two-layer mode. However, the present disclosure is not limited to this.

For example, the air conditioner 1 may not have the inside/outside air two-layer mode for the air suction mode, and may be set to only one of the outside air mode and the inside air mode.

Further, in the embodiments, the bypass passage 66 has the first bypass passage 66a and the second bypass passage 66b, on one side and the other side in the vertical direction DRud of the warm air passage 65, respectively. However, the present disclosure is not limited to this.

For example, the bypass passage 66 is composed of one, and may be arranged in either one side of the warm air passage 65 in the vertical direction DRud.

Further, in the embodiment, the first direction is the vertical direction DRud of the vehicle and the second direction is the width direction DRw of the vehicle, but is not limited to this.

For example, the first direction may be different from the vertical direction DRud of the vehicle, and the second direction may be different from the width direction DRw of the vehicle.

Overview

According to the first aspect shown in part or all of the embodiments, an air conditioner for air-conditioning a cabin for a vehicle includes a casing forming an air passage through which air flows and a blower fan arranged inside the casing. Further, the air conditioner includes a heating device arranged downstream side of the blower fan in the air flow inside the casing to heat the air blown out from the blower fan. The blower fan rotates around the fan axis to blow out the air sucked from one side of the fan axis in the axial direction in a direction away from the fan axis. The casing includes a fan housing portion in which the blower fan is housed and an equipment housing portion connected to the fan housing portion to house the heating device. The fan housing portion has a passage portion that forms an outlet passage for flowing air blown from the blower fan to the outside in the radial direction of the blower fan. The equipment housing portion includes a warm air passage for flowing the air blown from the blower fan to the heating device and a bypass passage for flowing the air blown from the blower fan to bypass the heating device. Further, the warm air passage and the bypass passage are arranged side by side in the direction orthogonal to the axial direction. When the arrangement direction of the warm air passage and the bypass passage is a first direction and the direction orthogonal to the axial direction and the first direction is a second direction, the passage portion has the blowout width dimension in the second direction, which is larger than the heater width dimension of the heating device in the second direction. Further, the blowout width dimension of the passage portion in the second direction is smaller than the blowout height dimension which is the size of the passage portion in the first direction.

According to the second aspect, the equipment housing portion includes an air mix door for adjusting the amount of air flowing through the heating device and the bypass passage, at the upstream side of the heating device in the air flow. Further, in the equipment housing portion, a first bypass passage is formed on one side of the heating device in the first direction, and a second bypass passage is formed on the other side of the heating device in the first direction.

According to this, the first bypass passage and the second bypass passage can easily secure an air passage having a sufficient size for passing cooled air. Further, the pressure loss can be suppressed in the air passage from the blower fan to the heating device in the second direction without increasing the pressure loss in the air passage from the blower fan to the heating device in the first direction.

According to the third aspect, the passage portion has an outer shape defined by a connection of a pair of blowout short side portions facing each other in the first direction and a pair of blowout long side portions facing each other in the second direction.

According to this, the air flowing from the passage portion toward the heating device in the second direction can be suppressed from spreading outward in the radial direction compared with the case where the pair of blowout long side portions facing in the second direction is formed in an arc shape. That is, the passage portion suppresses the contraction of air in the air passage from the blower fan to the heating device in the second direction as compared with the case where the pair of blowout long side portions facing in the second direction is formed in an arc shape. Thus, the pressure loss due to the contraction can be suppressed.

According to the fourth aspect, when the air conditioner is installed in the vehicle, the first direction of the passage portion is the vertical direction of the vehicle, and the second direction is the width direction of the vehicle. Further, the casing has a partition wall to define an outside air passage for circulating the outside air introduced from the outside of the cabin on the upper side inside the casing and an inside air passage for circulating the inside air introduced from the cabin on the lower side inside the casing.

According to this, when the air conditioner is operated in the inside/outside air two-layer mode, the outside air having a lower relative humidity than the inside air is blown out toward the windshield inside the cabin to prevent the fogging, and it is possible to improve the heating efficiency by circulating the inside air with high relative humidity than the outside air in the cabin. Further, since the casing has the outside air passage on the upper side in the vertical direction and the inside air passage on the lower side in the vertical direction, it is easy to guide the outside air to the defroster opening located on the upper side of the casing, and the inside air is easily drawn to the foot opening located on the lower side of the casing.

According to the fifth aspect, the outlet passage is provided with a resistance portion for suppressing the flow of air in the circumferential direction of the blower fan in a region where the size of the passage portion is smaller than the blowout height dimension.

According to this, the air flowing in the circumferential direction of the blower fan through the outlet passage is facilitated to flow to the downstream side in the axial direction by suppressing the air from flowing in the rotation direction at the downstream side of the resistance portion. That is, the resistance portion suppresses the flow of air to the downstream region, thereby suppressing the contraction of air in the region smaller than the blowout height dimension, and the pressure loss can be suppressed.

According to the sixth aspect, the resistance portion is arranged over the region where the distance between the passage portion and the fan axis is minimized.

The air blown from the blower fan has the largest pressure loss when the cross section of the outlet passage is the smallest. For this reason, in the air conditioner, the pressure loss caused by the contraction is minimized by arranging the resistance portion over the area where the cross section of the outlet passage is minimized, compared with a case where the resistance portion is arranged in another position.

According to the seventh aspect, an air conditioner for air-conditioning the cabin for a vehicle includes a casing forming an air passage through which air flows, and a blower fan arranged inside the casing. The blower fan rotates around the fan axis to blow out the air sucked from one side of the fan axis in the axial direction in a direction away from the fan axis. The casing includes a fan housing portion in which the blower fan is housed. The fan housing portion has a passage portion that forms an outlet passage for flowing air blown from the blower fan to the outside in the radial direction of the blower fan. When one direction orthogonal to the axial direction is a first direction and a direction orthogonal to each of the axial direction and the first direction is a second direction, the passage portion has the blowout width dimension in the second direction, which is larger than the heater width dimension of the heating device in the second direction. Further, the blowout width dimension of the passage portion in the second direction is smaller than the blowout height dimension of the passage portion in the first direction. The outlet passage is provided with a resistance portion that suppresses the flow of air in the circumferential direction of the blower fan in a region where the size of the passage portion is smaller than the blowout height dimension.

According to the eighth aspect, the resistance portion is arranged over the region where the distance between the passage portion and the fan axis is minimized. According to this, the air blown from the blower fan has the largest pressure loss when the cross section of the outlet passage is the smallest. For this reason, in the air conditioner, the pressure loss caused by the contraction of air can be suppressed by arranging the resistance portion over the area where the cross section of the outlet passage is minimized, compared with a case where the resistance portion is arranged in another position.

According to the ninth aspect, the passage portion has an outlet side partition wall for partitioning the outside air passage that circulates the outside air introduced from the outside of the cabin and the inside air passage that circulates the inside air introduced from the cabin. Further, the resistance portion is formed so as to be connected to the outlet side partition wall.

According to this, the outside air, which has a lower relative humidity than the inside air, is blown out toward the windshield in the cabin to prevent the fogging, and the inside air, which has a higher relative humidity than the outside air, is circulated inside the cabin to improve the heating efficiency.

According to the tenth aspect, the passage portion is arranged so that the second direction is the width direction of the vehicle when the air conditioner is installed in the vehicle. Further, the outlet side partition wall is formed so as to extend in the width direction so as to cross the passage portion.

According to this, when the air conditioner is operated in the inside/outside air two-layer mode, the outside air having a lower relative humidity than the inside air is blown out toward the windshield inside the cabin to prevent the fogging, and it is possible to improve the heating efficiency by circulating the inside air with high relative humidity than the outside air in the cabin. Further, since the outside air passage is formed on the upper side of the passage portion in the vertical direction and the inside air passage is formed on the lower side of the passage portion in the vertical direction, the outside air is guided to the defroster opening located on the upper side of the casing and the inside air can be guided to the foot opening located on the lower side of the casing.

What is claimed is:

1. An air conditioner that conditions air in a cabin for a vehicle, comprising:
    a casing that forms an air passage through which air flows;
    a blower fan arranged inside the casing to rotate about a fan axis to suck in air from one side in an axial direction and to blow out air in a direction away from the fan axis; and
    a heating device arranged downstream of the blower fan in a flow of air inside the casing to heat air blown out from the blower fan, wherein
    the casing includes a fan housing portion housing the blower fan and an equipment housing portion connected to the fan housing portion and housing the heating device,
    the fan housing portion has a passage portion outside of the blower fan in a radial direction to form an outlet passage through which air blown from the blower fan flows,
    the equipment housing portion has a warm air passage that allows air blown from the blower fan to flow to the heating device, and a bypass passage that allows air blown from the blower fan to bypass the heating device,
    the warm air passage and the bypass passage are arranged in a first direction orthogonal to the axial direction,
    a second direction is orthogonal to each of the axial direction and the first direction,
    a blowout width dimension of the passage portion in the second direction is larger than that of the heating device in the second direction,
    the blowout width dimension of the passage portion in the second direction is smaller than a blowout height dimension of the passage portion in the first direction,
    the passage portion has an outer shape by a connection of a pair of short sides facing in the first direction and a pair of long sides facing in the second direction, and
    the pair of long sides is formed in a straight line extended in the first direction.

2. The air conditioner according to claim 1, wherein
    an air mix door is disposed in the equipment housing portion at upstream of the heating device in a flow of air to adjust the amount of air flowing through the heating device and the bypass passage, and
    a first bypass passage is formed on one side of the heating device in the first direction, and a second bypass passage is formed on the other side of the heating device in the first direction.

3. The air conditioner according to claim 1, wherein
    the passage portion is arranged so that the first direction is a vertical direction of the vehicle and the second direction is a width direction of the vehicle when the air conditioner is installed in the vehicle, and
    the casing has a partition wall to define an outside air passage for circulating outside air introduced from out of the cabin on an upper side in the casing and an inside air passage for circulating inside air introduced from the cabin on a lower side in the casing.

4. The air conditioner according to claim 1, wherein
a resistance portion is disposed in the outlet passage in a region where a size of the passage portion is smaller than the blowout height dimension so as to suppress air from flowing in a circumferential direction of the blower fan.

5. The air conditioner according to claim 4, wherein the resistance portion is arranged over a region where a distance between the passage portion and the fan axis is minimized.

* * * * *